United States Patent
Kim et al.

(10) Patent No.: US 7,002,274 B2
(45) Date of Patent: Feb. 21, 2006

(54) ROTARY ELECTRIC MACHINE AND AUTOMOBILE PROVIDED WITH THE SAME

(75) Inventors: Houng Joong Kim, Hitachi (JP); Yoshitaka Iwaji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 10/392,400

(22) Filed: Mar. 20, 2003

(65) Prior Publication Data

US 2004/0021390 A1   Feb. 5, 2004

(30) Foreign Application Priority Data

Jul. 31, 2002   (JP)   ............................. 2002-222351

(51) Int. Cl.
*H02K 21/12*   (2006.01)
(52) U.S. Cl. .................................................... 310/114
(58) Field of Classification Search ........... 310/154.32, 310/154.33, 156.01, 261, 114, 59, 209, 156.25, 310/156.24, 156.16, 156.17, 156.18, 156.08, 310/156.12, 156.15, 254
See application file for complete search history.

(56) References Cited

U.S. PATENT DOCUMENTS

| | | | | |
|---|---|---|---|---|
| 3,713,015 | A * | 1/1973 | Frister | 322/28 |
| 3,936,685 | A * | 2/1976 | Glockner et al. | 310/209 |
| 4,484,083 | A * | 11/1984 | Jefferies | 290/45 |
| 5,177,391 | A * | 1/1993 | Kusase | 310/263 |
| 5,387,061 | A * | 2/1995 | Barkman et al. | 409/80 |
| 5,562,528 | A * | 10/1996 | Ueyama et al. | 451/11 |
| 5,821,710 | A * | 10/1998 | Masuzawa et al. | 318/254 |
| 6,084,326 | A * | 7/2000 | Nagai et al. | 310/80 |
| 6,508,614 | B1 * | 1/2003 | Ozaki et al. | 409/231 |
| 6,541,877 | B1 * | 4/2003 | Kim et al. | 290/44 |
| 6,771,000 | B1 * | 8/2004 | Kim et al. | 310/209 |
| 6,841,911 | B1 * | 1/2005 | Kim et al. | 310/114 |
| 2002/0047319 | A1 * | 4/2002 | Ferrari et al. | 310/12 |
| 2002/0116961 | A1 * | 8/2002 | Kim et al. | 68/23.7 |
| 2002/0117922 | A1 * | 8/2002 | Kim et al. | 310/114 |
| 2002/0117926 | A1 * | 8/2002 | Joong et al. | 310/191 |
| 2002/0117927 | A1 * | 8/2002 | Kim et al. | 310/191 |
| 2002/0117933 | A1 * | 8/2002 | Joong et al. | 310/261 |
| 2002/0158520 | A1 * | 10/2002 | Takamune et al. | 310/20 |

FOREIGN PATENT DOCUMENTS

| | | | |
|---|---|---|---|
| JP | 1085644 | * | 8/2000 |
| JP | 2001069609 | * | 3/2001 |
| JP | 200262488 | * | 9/2002 |

(Continued)

*Primary Examiner*—Darren Schuberg
*Assistant Examiner*—Heba Elkassabgi
(74) *Attorney, Agent, or Firm*—Crowell & Moring LLP

(57) ABSTRACT

In a rotary electric machine capable of improving the reliability of an object provided with the same, a permanent magnet type synchronous rotary electric machine comprises has a stator provided with windings. A rotor arranged supported for rotation in the stator with a gap between the inner surface of the stator and the outer surface thereof, is divided into two rotor bodies each provided with permanent magnets of opposite polarities alternately arranged in a circumferential direction. In switching the permanent magnet type synchronous rotary electric machine from a motor to a generator, a second rotor body is moved axially relative to a first rotor body to an axial position that makes the intensity of a combined magnetic field created by the permanent magnets lower than that of a combined magnetic field created by the permanent magnets when the second rotor body is located at a predetermined position, and then the second rotor body is moved to the predetermined position.

18 Claims, 8 Drawing Sheets

FOREIGN PATENT DOCUMENTS

| | | | |
|---|---|---|---|
| JP | 2002262487 | * | 9/2002 |
| JP | 2002262489 | * | 9/2002 |
| JP | 2002262494 | * | 9/2002 |
| JP | 2003244874 | * | 8/2003 |

* cited by examiner

ROTARY ELECTRIC MACHINE AND AUTOMOBILE PROVIDED WITH THE SAME

BACKGROUND OF THE INVENTION

The present invention relates to a rotary electric machine capable of mechanically varying effective magnetic flux, and an automobile provided with the rotary electric machine.

A rotary electric machine capable of mechanically varying effective magnetic flux is disclosed in, for example, Japanese Patent Laid-open No. 2001-69609. This prior art rotary electric machine has a rotor including axially arranged first and second rotor bodies each provided with field magnets of different polarities alternately arranged in a rotating direction. The pole center of the field magnets of the first rotor body and that of the field magnets of the second rotor body are aligned by balancing magnetic force acting between the respective field magnets of the first and the second rotor body, and the direction of torque of the rotor when the rotary electric machine is operated as an electric motor. The pole center of the field magnets of the second rotor body is shifted relative to the pole center of the field magnets of the first rotor body when the rotary electric machine is used as a generator.

In this prior art rotary electric machine, the position of the second rotor body is variable relative to the first rotor body. The first rotor body is fixedly mounted on a rotor shaft, and the second rotor body is separated from the rotor shaft. The second rotor body and the rotor shaft are interlocked by a screw mechanism. A support mechanism supports a part opposite to a part, on the side of the first rotor body, of the second rotor body.

In the rotary electric machine employing such a mechanical varying mechanism, it is desirable for the improvement of the reliability of an object, such as an automobile, mounted with the rotary electric machine to relieve shocks that act on the second rotor body and the mechanical varying mechanism and to reduce load on the second rotor body and the mechanical varying mechanism when the position of the second rotor body is varied according to, for example, the change of the direction of the torque of the second rotor body. Such shock absorption is particularly desirable, for example, for electric automobiles and hybrid automobiles which repeat a torque assisting operation and a regenerating operation frequently.

SUMMARY OF THE INVENTION

The present invention provides a rotary electric machine capable of improving the reliability of an object mounted with the rotary electric machine. The present invention provides also an automobile provided with a highly reliable rotary electric machine. More concretely, the present invention provides a rotary electric machine capable of relieving shocks that act on a rotor and a varying mechanism when the operation of the rotor is varied and of reducing load on the rotor and the varying mechanism, and an automobile provided with the rotary electric machine.

The present invention is characterized in that a rotor includes axially arranged first and second rotor bodies each provided with field magnets of different polarities alternately arranged in a rotating direction, the axial position of the second rotor body is changed after moving the second rotor body relative to the first rotor body to a position that makes the intensity of a combined magnetic field lower than that of a combined magnetic field that is created when the second rotor body is located at the predetermined position in changing the axial position of the second rotor body relative to the first rotor body to the predetermined position such that the intensity of a combined magnetic field created by the field magnets is reduced, or in that the magnetic pole position of the field magnets of the second rotor body relative to the magnetic pole position of the field magnets of the first rotor body and the axial position of the second rotor body are changed after changing the magnetic pole position of the field magnets of the second rotor body relative to the magnetic pole position of the field magnets of the first rotor body and moving the second rotor body to a position that makes the intensity of the combined magnetic field lower than that of the combined magnetic field that is created when the second rotor body is located at the predetermined position in changing the magnetic pole position of the field magnets of the second rotor body relative to the magnetic pole position of the field magnets of the first rotor body and changing the axial position of the second rotor body relative to the first rotor body to the predetermined positions such that the intensity of a combined magnetic field created by the field magnets is reduced.

In this specification, the term "axial direction" denotes a direction parallel to the center axis of the rotor shaft.

BRIEF DESCRIPTION OF THE DRAWINGS

Other objects and advantages of the invention will become apparent from the following description of embodiments with reference to the accompanying drawings in which.

DETAILED DESCRIPTION OF THE CURRENTLY PREFERRED EMBODIMENTS

Figure 1:
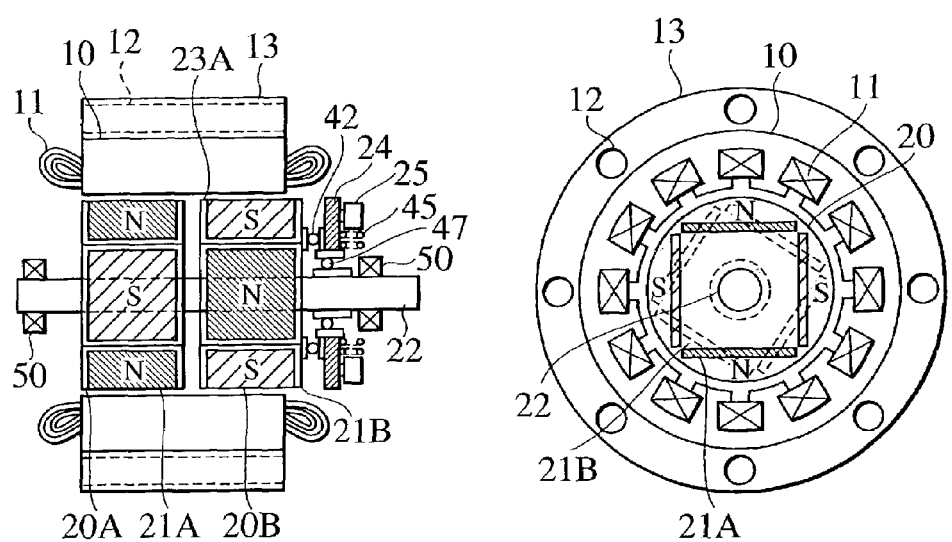
FIG. 1 are sectional views of a permanent magnet type synchronous rotary electric machine along and transverse to the center axis in a first embodiment according to the present invention.

A first embodiment of the present invention will be described with reference to FIGS. 1 to 9. FIG. 4 shows the arrangement of the mechanisms of a drive system included in a hybrid automobile. The drive system of the hybrid automobile includes an internal combustion engine 1 as a power plant, a transmission 3, and a permanent magnet type synchronous rotary electric machine 2 interposed between the engine 1 and the transmission 3. The engine 1 and the permanent magnet type synchronous rotary electric machine 2 are mechanically connected to each other by directly connecting the output shaft of the engine 1, i.e., the crankshaft to the rotor shaft of the permanent magnet type synchronous rotary electric machine 2, or through a speed change gear including a planetary reduction gear.

The transmission 3 and the permanent magnet type synchronous rotary electric machine 2 are connected to each other by connecting the input shaft, not shown, of the transmission 3 to the rotor shaft, not shown, of the permanent magnet type synchronous rotary electric machine 2 through a clutch, i.e., a machine element for the connection and disconnection of shafts, or a fluid coupling using a working fluid, or a torque converter. Since the transmission 3 and the permanent magnet type synchronous rotary electric machine 2 are connected to each other by the clutch, the fluid coupling or the torque converter, the permanent magnet type synchronous rotary electric machine 2 is able to start the engine 1, and the driving force of the engine 1 or both the driving forces of the engine 1 and the permanent magnet type synchronous rotary electric machine 2 can be transmitted to the input shaft of the transmission 3 after the engine 1 has been started.

The permanent magnet type synchronous rotary electric machine 2 is capable of operating as either an electric motor or a generator. A battery 5, i.e., an energy storage means, is connected electrically through a power converter 4 to the permanent magnet type synchronous rotary electric machine 2.

When the permanent magnet type synchronous rotary electric machine 2 is used as an electric motor, the power converter (inverter) 4 converts dc power provided by the battery 5 into ac power and supplies the ac power to the permanent magnet type synchronous rotary electric machine 2 to drive the permanent magnet type synchronous rotary electric machine 2. The driving force of the permanent magnet type synchronous rotary electric machine 2 is used for starting the engine 1 or assisting the engine 1. When the permanent magnet type synchronous rotary electric machine 2 is used as a generator, the power converter 4 converts ac power generated by the permanent magnet type synchronous rotary electric machine 2 into dc power and supplies the dc power to the battery 5. Thus, the battery 5 stores the dc power.

Figure 2:
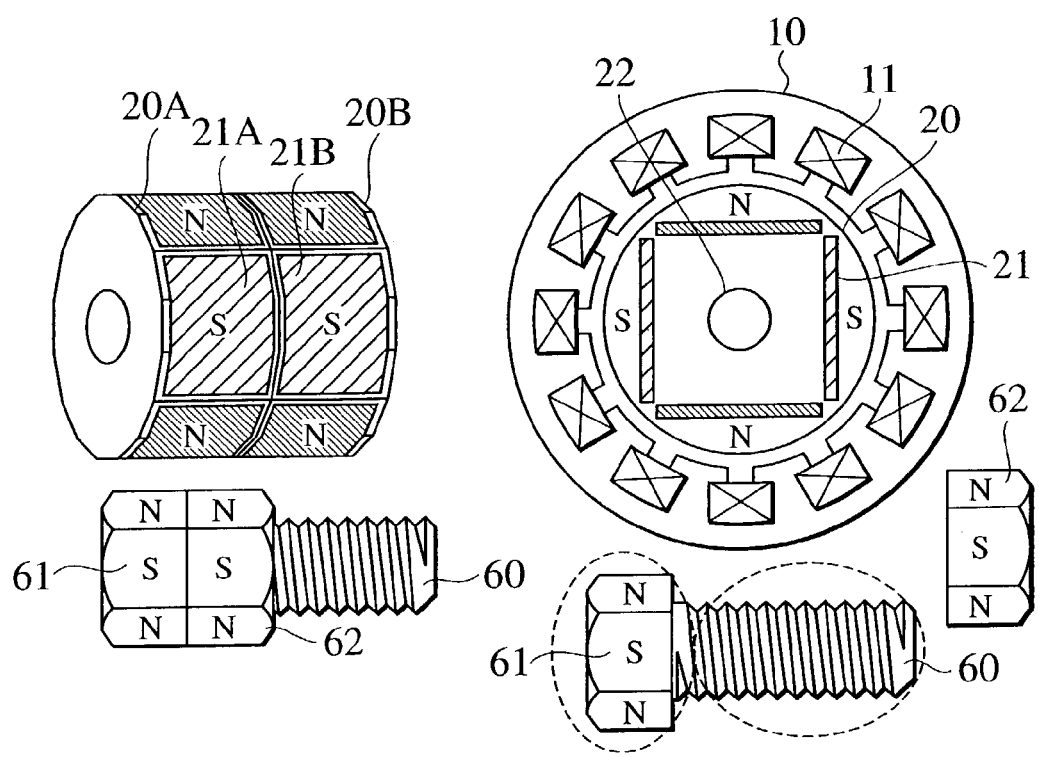
FIG. 2 is an explanatory view for the operation of the permanent magnet type synchronous rotary electric machine shown in FIG. 1, in which magnetic pole centers of a rotor are aligned.
Figure 3:
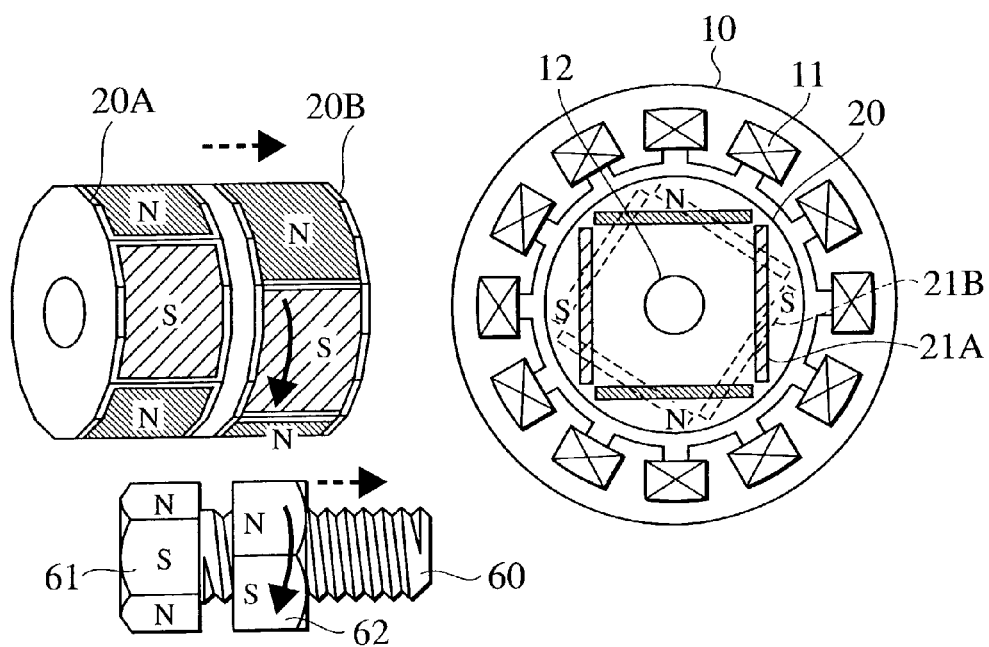
FIG. 3 is an explanatory view for the operation of the permanent magnet type synchronous rotary electric machine shown in FIG. 1, in which magnetic pole centers of a rotor are displaced relative to each other.
Figure 4:
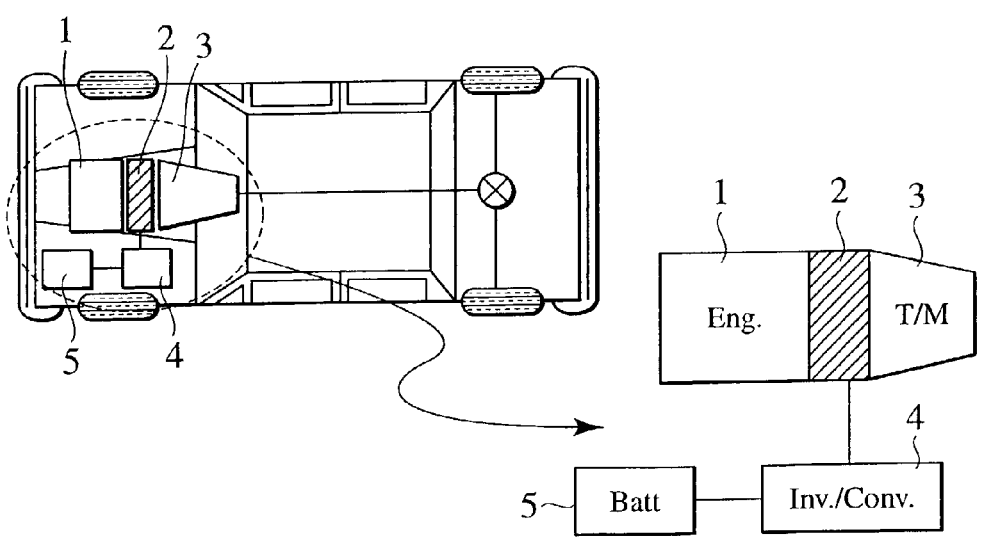
FIG. 4 is a schematic plan view of the arrangement of mechanisms a driving system included in a hybrid automobile provided with the permanent magnet type synchronous rotary electric machine shown in FIG. 1, in which an engine is connected directly to the permanent magnet type synchronous rotary electric machine.

FIGS. 1 to 3 show the constitution of the permanent magnet type synchronous rotary electric machine 2. In FIGS. 1 to 3, indicated at 13 is a housing, i.e., stator frame. A plurality of cooling water passages 12 are extended axially and arranged circumferentially in the housing 13. A stator core 10 is fixedly fitted in the housing 13 by shrinkage fitting or press fitting. A plurality of axial slots (grooves), which are opened at the inner circumference surface of the stator core 10, are formed in the inner circumference of the stator core 10. Armature windings 11, i.e., stator windings or primary windings, are placed in the slots. Although the housing 13 of this embodiment has opposite open ends, the opposite ends of the housing 13 may be closed by brackets.

A rotor 20 is supported for rotation in the stator core 10 with a gap formed between the inner circumference of the stator core 10 and the outer circumference of the rotor 20. The rotor 20 is divided into two parts, namely, a first rotor block 20A and a second rotor block 20B. The first rotor block 20A is fixedly mounted on a shaft 22, i.e., rotor shaft. The second rotor block 20B is mounted for movement on the shaft 22. The second rotor block 20B is turned and moved axially when a predetermined torque is applied thereto. A plurality of permanent magnets 21A of different polarities are embedded in the first rotor body 20A in an alternate circumferential arrangement. A plurality of permanent magnets 21B of different polarities are embedded in the second rotor body 20B in an alternate circumferential arrangement. The opposite axial ends of the shaft 22 are supported for rotation in bearings 50. The bearings 50 are held on the engine 1, the case of the transmission 3 or parts of the body of the automobile. When the brackets are attached to the opposite axial ends of the housing 13, the bearings 50 may be held on the brackets.

The first rotor body 20A, the second rotor body 20B and the shaft 22 are related by a bolt-and-nut relation; that is, the first rotor body 20A, the shaft 22 and the second rotor body 20B correspond to the head 61 of a bolt, a threaded part 60 of the bolt and a nut 62, respectively. Therefore, the first rotor body 20A is fixed to the shaft 22. An external thread mating with the external thread formed on the shaft 22 is cut on the surface of the shaft 22. An internal thread is cut on the inner surface of the second rotor body 20B. The second rotor body 20B moves in one axial direction away from the first rotor body 20A when the second rotor body 20B is turned on the shaft 22 in one rotating direction, and the second rotor body 20B moves in the opposite axial direction and, eventually, is joined to the first rotor body 20A when the second rotor body 20B is turned on the shaft 22 in the opposite rotating direction.

A support mechanism is disposed on one end part of the shaft 22, i.e., beside an outer end not facing the first rotor body 20A of the second rotor body 20B. The support mechanism is capable of bearing the second rotor body 20B from a side opposite a side facing the first rotor body 20A without restraining the second rotor body 20B from rotation to support the second rotor body 20B for rotation, and of permitting the axial movement of the second rotor body 20B relative to the first rotor body 20A. The support mechanism serves also as an axial movement limiting mechanism for preventing the end of the second rotor 20B from projecting beyond a predetermined distance from the corresponding axial end of the stator core 10.

The support mechanism is a servomechanism capable of controlling the axial position of the second rotor body 20B relative to the first rotor body 20A, and includes a stopper 24 disposed on the outer side of the second rotor body 20B opposite to the side facing the first rotor body 20A and capable of axially moving in opposite directions along the shaft 22, and a driving mechanism disposed on the outer side of the stopper 24 opposite to the side facing the second rotor body 20B to move the stopper 24 linearly in opposite directions. The driving mechanism includes an actuator 25 for linearly moving the stopper 24 in one axial direction, and a spring 45 pulling the stopper 24 in the opposite axial direction.

The stopper 24, i.e., a support member, has a surface facing the outer end surface of the second rotor body 20B opposite the inner end surface of the same facing the first rotor body 20A. The stopper 24 is a flat, annular member disposed opposite to the outer surface of the rotating shaft 22 so as to surround a part of the shaft 22. A bearing mechanism 47 is interposed between the inner surface of the stopper 24 and the surface of the shaft 22. The bearing mechanism 47 permits the stopper 24 to move axially along the rotating shaft 22. A bearing mechanism 42 is interposed between the inner surface facing the second rotor body 20B of the stopper 24 and the outer end surface not facing the first rotor body 20A of the second rotor body 20B. The bearing mechanism 42 supports the second rotor body 20B without restraining the second rotor body 20B from rotation, and permits the second rotor body 20B to rotate.

The actuator 25 is a solenoid actuator including a movable core 25a having one end mechanically connected to the outer surface not facing the second rotor body 20B of the stopper 24 and capable of axially moving toward the second rotor body 20B, and a driver 25b formed by winding a solenoid around a fixed core and capable of generating magnetic force repulsing for the actuator 25 to drive the movable core 25a for axial movement toward the second rotor body 20B. The actuator 25 is attached to the engine 1, the case of the transmission 3 or a part of the body of the automobile. A spring 45, i.e., an elastic member, is interposed between the actuator 25 and the shaft 22, and is extended between the engine 1, the case of the transmission 3 or a part of the body of the automobile, and the outer surface not facing the second rotor body 20B of the stopper 24. If the opposite axial ends of the housing 13 are closed by brackets, the actuator 25 and one end of the spring 45 may be attached to the brackets.

In this embodiment, current flowing through the solenoid of the driver 25b of the actuator 25 is controlled to control energizing the solenoid. The optional control of the axial position of the stopper 24 can be achieved by thus balancing the driving force of the actuator 25 and the pulling force of the spring 45. Thus, the axial position of the second rotor body 20B relative to the first rotor body 20A can be optionally changed by the support mechanism. In this embodiment, the driver of the support mechanism is a combination of the solenoid actuator that drives the movable core 25a magnetically, and the spring 45. The support mechanism may be a combination of a hydraulic actuator or an electromagnetic clutch, and a spring, a combination of a motor and a ball screw, or a linear motor. The point is that any mechanisms may be used provided that the mechanisms are able to form a servomechanism capable of position control.

The operation of the permanent magnet type synchronous rotary electric machine 2 will be described. In a rotary electric machine having a rotor provided with permanent magnets to create magnetic fields, torque acts on the rotor in opposite directions when the rotary electric machine is used as an electric motor and when the same is used as a generator, respectively, if the rotating direction of the rotor is fixed. If the rotor rotates in opposite directions, torque acts on the rotor in opposite directions. Basically, this embodiment is based on the foregoing principle. The rotary electric machine operates as an electric motor while the same is driven for operation at rotating speeds in a low rotating speed range in such a state as at the start of the engine 1, and operates as a generator while the same is driven for operation at rotating speeds in a high rotating speed range.

While the rotary electric machine is driven for operation at rotating speeds in a low rotating speed range in such a state as at the start of the engine 1, the second rotor body 20B is moved toward the first rotor body 20A and the first rotor body 20A and the second rotor body 20B are joined together by the balance between the direction of torque generated by the rotor 20, and magnetic force acting between the permanent magnets 21A and 21B to unite together the first rotor body 20A and the second rotor body 20B in a single rotor body as shown in FIG. 2, with the permanent magnets 21A and 21B of the same polarities arranged axially side by side to align the magnetic pole centers of the permanent magnets 21A and 21B. This operation is equivalent to turning the nut 62 on the bolt so as to approach the head 61 of the bolt. The effective magnetic flux of the permanent magnets is increased to a maximum and the rotary electric machine has a high-torque characteristic.

While the rotary electric machine is driven for operation at rotating speeds in the high rotating speed range, the rotor rotates in the same direction as that in which the rotor is driven when the rotary electric machine is used as an electric motor, but torque acts on the rotor in a direction opposite to that in which torque acts on the rotor when the rotary electric machine is used as a motor. Consequently, as shown in FIG. 3, the second rotor body 20B is turned on the shaft 22 in the opposite direction so as to move axially away from the first rotor body 20A to displace the magnetic pole centers of the permanent magnets 21A and 21B relative to each other. This operation is equivalent to turning the nut 62 so as to move away from the head 61 of the bolt. Consequently, the effective magnetic flux of the permanent magnets decreases; that is, this operation has a field weakening effect. Thus, the rotary electric machine has a high-output power generating characteristic.

Field weakening control can be achieved by axially adjacently arranging the permanent magnets 21A and 21B of the same polarity with the centers of magnetic poles of the permanent magnets 21A and 21B aligned with each other and changing the axial position of the second rotor body 20B relative to the first rotor body 20A, or can be achieved by joining the second rotor body 20A to the first rotor body 20A to form a single rotor body and displacing the magnetic pole centers of the permanent magnets 21A and 21B relative to each other.

Figure 5A:
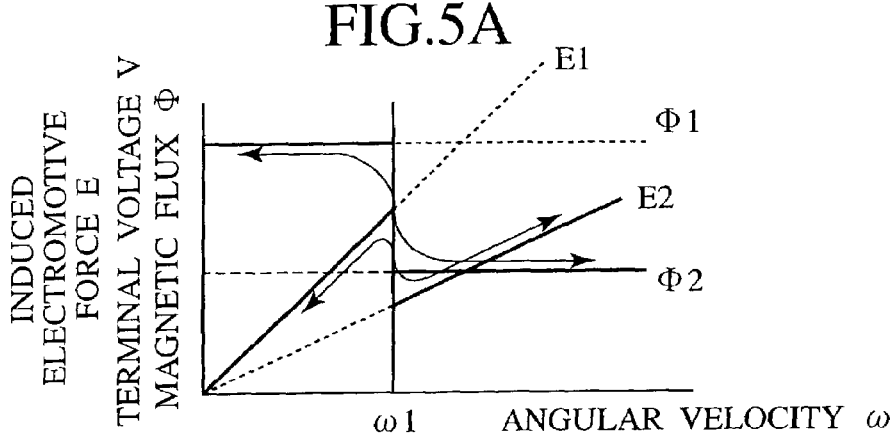
FIGS. 5A and 5B are graphs showing the dependence of induced electromotive force E and magnetic flux Φ on the angular velocity ω of the permanent magnet type synchronous rotary electric machine shown in FIG. 1.
Figure 5B:
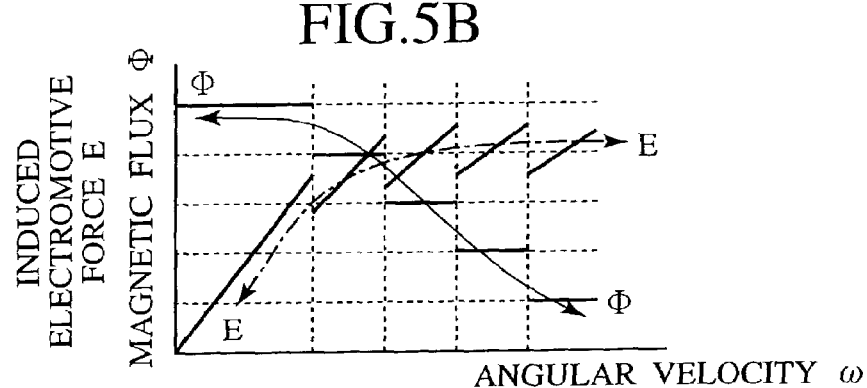

Operation of the rotary electric machine as mentioned above according to the rotating speed range will be described with reference to FIGS. 5A and 5B. FIGS. 5A and 5B are graphs showing the variation of effective magnetic flux $\Phi$ and induced electromotive force E with angular velocity $\omega$ of the rotor shaft of the permanent magnet type synchronous rotary electric machine 2. Induced electromotive force E of the permanent magnet type synchronous rotary electric machine 2 is dependent on the effective magnetic flux $\Phi$ produced by the permanent magnets 21A and 21B on the rotor 20 and the angular velocity Φ of the rotor 20. Therefore, as shown in FIG. 5A, the induced electromotive force E1 increases in proportion to the angular velocity ω when the effective flux Φ1 produced by the permanent magnets 21A and 21B on the rotor 20 is fixed and the angular velocity ω (rotating speed) is raised.

However, when the permanent magnet type synchronous rotary electric machine 2 is operated as an electric motor or a generator in the same effective magnetic flux over the entire range of rotation, for example when it is operated as a generator in a high rotating speed range with effective magnetic flux Φ1, the electromotive force E1 of the permanent magnet type synchronous rotary electric machine 2 increases beyond a charging voltage for charging the battery 5 and, consequently, the battery 5 is damaged by the electromotive force E1. Therefore, the induced electromotive force of the permanent magnet type synchronous rotary electric machine 2 must be limited to voltages not higher than the charging voltage for charging the battery 5. Therefore, when the permanent magnet type synchronous rotary electric machine 2 is used as a generator, field weakening control must be performed to reduce the magnetic flux produced by the permanent magnets 21A and 21B when the rotating speed of the rotor 20 is in a rotating speed range beyond a certain limit rotating speed.

This embodiment makes the permanent magnets 21A and 21B produce an effective magnetic flux Φ1 to generate an induced electromotive force E1 when the rotating speed of the rotor 20 is in a low rotating speed range below an angular velocity ω1 as shown in FIG. 5A. When the rotating speed of the rotor 20 is in a high rotating speed range not lower than the angular velocity ω1, the permanent magnets 21A and 21B are made to produce an effective magnetic flux Φ2 to generate an induced electromotive force E2 lower than the induced electromotive force E1. Thus, a maximum induced electromotive force that can be generated by the permanent magnet type synchronous rotary electric machine 2 is limited. Thus, the battery 5 can be charged by electric energy of a voltage not higher than an appropriate charging voltage for charging the battery 5 even when the permanent magnet type synchronous rotary electric machine 2 is operated at high rotating speeds in the high rotating speed range for use as a generator. Thus, the battery 5 can be prevented from being damaged.

The prior art rotary electric machine achieves field weakening control by flowing a field weakening control current through the stator windings. Since the field weakening control current needs to be increased according to induced electromotive force that rises in proportion to angular velocity, heat generated by the stator windings increases with angular velocity. Therefore, there is the possibility that efficiency of the prior art rotary electric machine decreases in the high rotating speed range, heat is generated at a high rate exceeding cooling ability, and the permanent magnets are demagnetized by the generated heat. Such problems never arise in the permanent magnet type synchronous rotary electric machine 2 in this embodiment because the permanent magnet type synchronous rotary electric machine 2 in this embodiment achieves field weakening control by mechanical control, namely, control of effective magnetic flux by the division of the rotor into the two rotor bodies.

The permanent magnet type synchronous rotary electric machine 2 in this embodiment can be used as an efficient assist for driving in a state where the permanent magnet type synchronous rotary electric machine 2 operates in a high rotating speed range because the permanent magnet type synchronous rotary electric machine 2 suppresses induced electromotive force in the high rotating speed range through the mechanical field weakening control without reducing the efficiency thereof.

As shown in FIG. 5B, this embodiment changes the effective magnetic flux Φ in steps according to the small variation of the angular velocity ω by gradually moving the second rotor body 20B away from the first rotor body 21A by the support mechanism. Consequently, it is possible to maintain the induced electromotive force E generated by the permanent magnet type synchronous rotary electric machine 2 substantially fixed in a state where the angular velocity ω1 is in the high rotating speed range.

Figure 6:
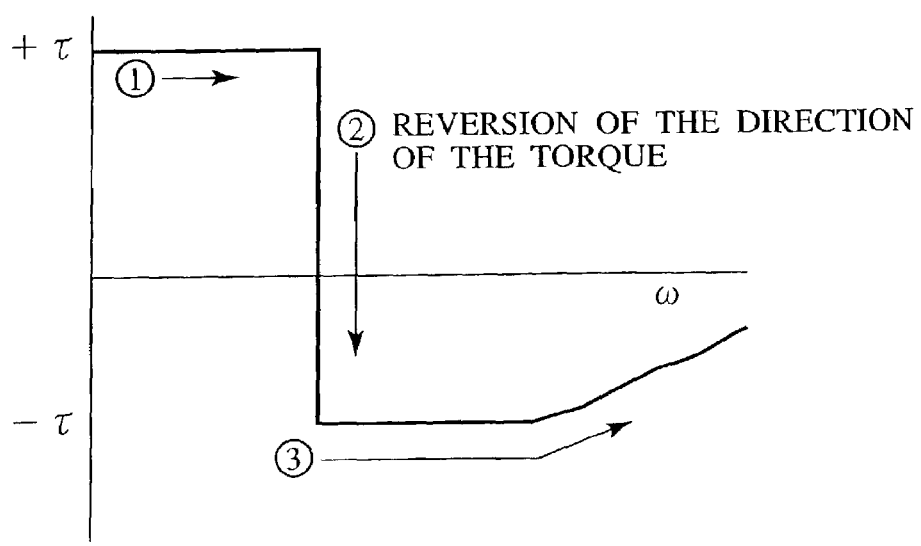
FIG. 6 is a graph showing the relation between the angular velocity ω and the torque τ of the permanent magnet type synchronous rotary electric machine shown in FIG. 1.

As mentioned above, the permanent magnet type synchronous rotary electric machine 2 is used as an electric motor to start the engine in the low rotating speed range, and the permanent magnet type synchronous rotary electric machine 2 is used as a generator for power generation in the high rotating speed range. FIG. 6 shows the dependence of the torque of the permanent magnet type synchronous rotary electric machine 2 on the angular velocity ω of the rotor of the permanent magnet type synchronous rotary electric machine 2. As obvious from FIG. 6, in a range indicated by □→ where the permanent magnet type synchronous rotary electric machine 2 operates as an electric motor, the torque remains constant at +τ regardless of increase of the angular velocity ω. When the operating mode of the permanent magnet type synchronous rotary electric machine 2 changes from that of an electric motor to that of a generator at a state indicated by □→, the torque changes from the positive torque +τ to a negative torque −τ. In a range indicated by □→ where the permanent magnet type synchronous rotary electric machine 2 operates as a generator, the torque remains constant at a negative torque −τ regardless of increase of the angular velocity ω, and the absolute value of the negative torque −τ, decreases gradually as the angular velocity ω increases beyond a certain angular velocity.

The state of the permanent magnet type synchronous rotary electric machine 2 where the second rotor body 20B is joined to the first rotor body 20A and the magnetic pole centers of the permanent magnets 21A and 21B are aligned with each other changes according to the change of the torque; the second rotor body 20B is turned on the shaft 22 so as to axially move away from the first rotor body 20A and the magnetic pole centers of the permanent magnets 21A and 21B are displaced relative to each other. In this state, the support mechanism moves the stopper 24 to a position suitable for stopping the second rotor body 20B at a predetermined position for making the intensity of a combined magnetic field created by the permanent magnets 21A and 21B coincide with a predetermined value, and stops the further axial movement of the second rotor body 20B away from the first rotor body 20A. The absolute value of a torque change is a maximum when the torque of the rotor 20 changes from the positive torque +τ to the negative torque −τ. Therefore, if the foregoing control is executed, large shocks are exerted on the second rotor body 20B, a mechanical axial position changing mechanism including bolts and nuts for changing the axial position of the second rotor body 20B relative to the first rotor body 20A, and the support mechanism. Therefore, it is desirable, in view of improving the reliability of the rotary electric machine and hence the reliability of the object provided with the rotary electric machine, such as a hybrid automobile, to relieve those shocks and to reduce load on those components.

Figure 7A:
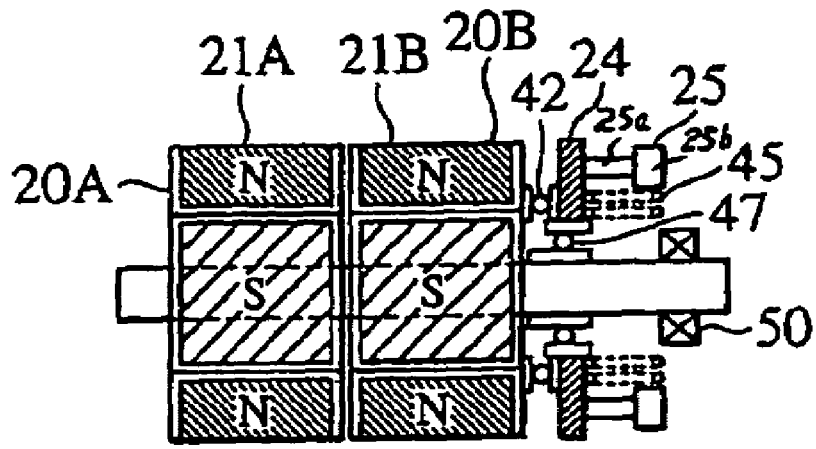
FIGS. 7A to 7C are explanatory views for the operation of the permanent magnet type synchronous rotary electric machine shown in FIG. 1, showing a state in which the magnetic pole centers of the rotor are aligned and a state in which the magnetic pole centers of the rotor are displaced.
Figure 7B:
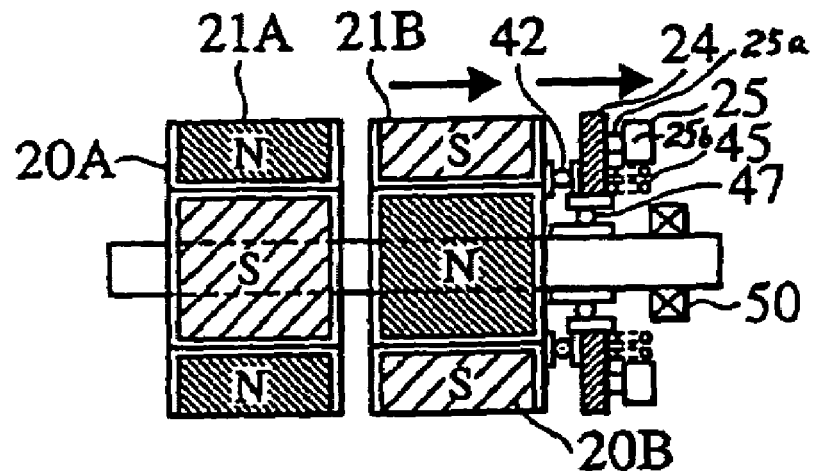
Figure 7C:
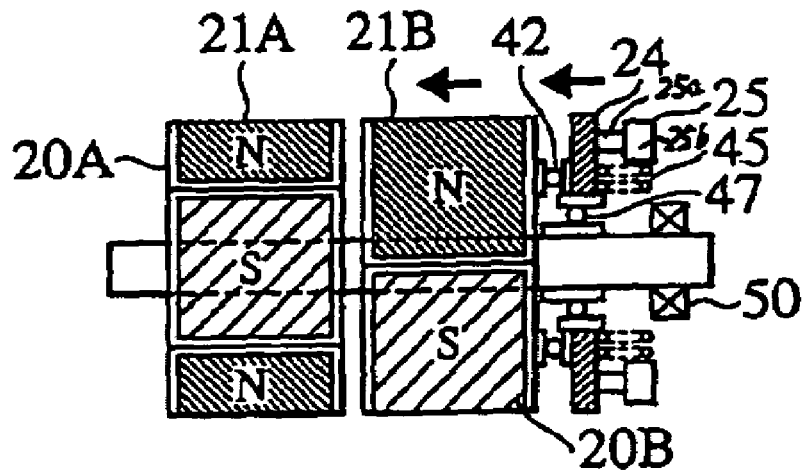

With such a requirement in view, this embodiment operates the permanent magnet type synchronous rotary electric machine 2 as shown in FIG. 7 according to the variation of the torque. A state of the permanent magnet type synchronous rotary electric machine 2 shown in FIG. 7A is changed through a state shown in FIG. 7B to a state shown in FIG. 7C. The state shown in FIG. 7A is the initial state of the permanent magnet type synchronous rotary electric machine 2 where the first rotor body 20A and the second rotor body 20B are joined together by the balance of the direction of torque of the rotor 20 and magnetic force acting between the field magnets 21A of the first rotor body 20A and the field magnets 21B of the second rotor body 20B, and the permanent magnets 21A and 21B of the same polarities are aligned axially and the magnetic pole centers of the permanent magnets 21A and 21B are aligned.

In this state, the support mechanism disposed on the outer side of the second rotor body 20B not facing the first rotor body 20A supports the second rotor body 20B. The current flowing through the solenoid of the driver 25*b* of the actuator 25 is controlled such that the stopper 24 is located so as to support the second rotor body 20B moved toward and joined to the first rotor body 20A. In this state, the pulling force of the spring 45 is balanced with the driving force of the actuator 25.

FIG. 7B shows an intermediate state between the states respectively shown in FIGS. 7A and 7C. As the direction of the torque acting on the rotor 20 in the state shown in FIG. 7A is reversed, the second rotor body 20B is turned on the shaft 22 so that the second rotor body 20B moves axially away from the first rotor body 20A to an axial position relative to the first rotor body 20A such that the intensity of a combined magnetic field created by the field magnets 21A and 21B is reduced below a predetermined intensity, i.e., to an axial position farther away from the first rotor body 20A from the axial position of the second rotor body 20B relative to the first rotor body 20A shown in FIG. 7C, and the magnetic pole centers of the permanent magnets 21A and 21B are displaced relative to each other.

When the second rotor body 20B is thus moved axially away from the first rotor body 20A, the stopper 24 of the support mechanism restrains the second rotor body 20B from axially moving beyond a proper position so that the intensity of the combined magnetic field created by the permanent magnets 21A and 21B is lower than the predetermined intensity. The support mechanism controls the current flowing through the solenoid of the driver 25*b* of the actuator 25 to control the magnetization of the solenoid so that the driving force of the actuator 25 is made lower than that in the state shown in FIG. 7A to move the stopper 24 to the proper position for stopping the second rotor body 20B. Upon the arrival of the stopper 24 at the proper position for stopping the second rotor body 20B, the pulling force of the spring 45 and the driving force of the actuator 25 balance with each other.

FIG. 7C shows a final state where the second rotor body 20B is located relative to the first rotor body 20A at an axial position that makes the intensity of the combined magnetic field created by the permanent magnets 21A and 21B coincide with the predetermined intensity, and the magnetic pole centers of the permanent magnets 21A and 21B are displaced from each other.

In this state, the support mechanism axially moves the second rotor body 20B relative to the first rotor body 20A to a predetermined position to make the intensity of the combined magnetic field created by the permanent magnets 21A and 21B coincide with a predetermined intensity by the stopper 24. The current flowing through the solenoid of the driver 25*b* of the actuator 25 is controlled to control the magnetization of the solenoid such that the driving force of the actuator 25 is intensified over that in the state shown in FIG. 7B and the stopper 24 is moved to a position to hold the second rotor body 20B at the predetermined position that makes the pulling force of the spring 45 and the driving force of the actuator 25 balance with each other.

In changing the permanent magnet type synchronous rotary electric machine 2 from the electric motor to the generator, i.e., in changing the state shown in FIG. 7A into the state shown in FIG. 7C, the second rotor body 20B is located relative to the first rotor body 20B at the axial position that makes the intensity of the combined magnetic field created by the permanent magnets 21A and 21B lower than the predetermined intensity as shown in FIG. 7B, and then the second rotor body 20B is located at the predetermined position that makes the intensity of the combined magnetic field created by the permanent magnets 21A and 21B coincide with the predetermined intensity. Therefore, shocks exerted on the second rotor body 20B, the mechanical axial position changing mechanism including bolts and nuts for changing the axial position of the second rotor body 20B relative to the first rotor body 20A, and the support mechanism can be relieved, and load thereon can be reduced, which improves the reliability of the hybrid automobile.

In playing catch, large shocks will be exerted on the hand protected by a glove if a ball flying at a high flying velocity is caught in the glove without retracting the glove. The control operation of the foregoing shock relieving means of this embodiment is analogous with a shock relieving control operation for relieving shocks that may be exerted on the hand protected by the glove in catching a ball flying at a high flying velocity by retracting the glove, which will be referred to also as 'catch control operation'. The flying ball, the glove and the hand correspond to the second rotor body 20B, the stopper 24, and the actuator 25, respectively.

Figure 8:
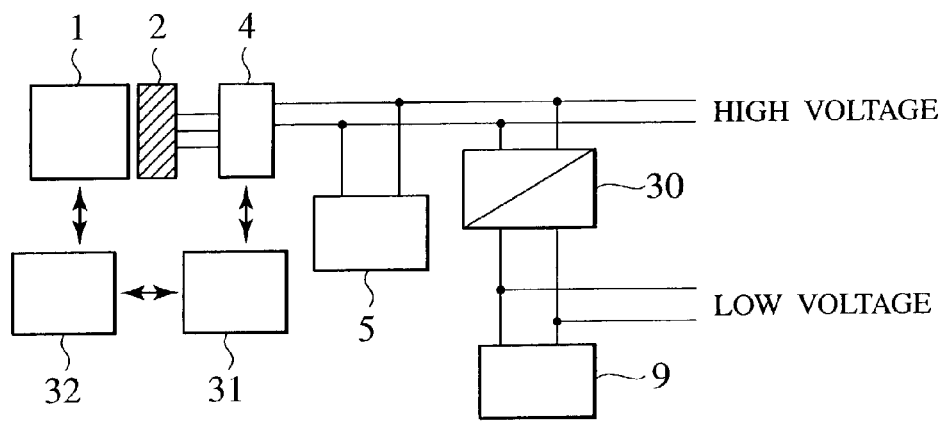
FIG. 8 is a block diagram of a power supply system for supplying power to the permanent magnet type synchronous rotary electric machine shown in FIG. 1.

FIG. 8 shows a power supply system for supplying power to the permanent magnet type synchronous rotary electric machine 2. The permanent magnet type synchronous rotary electric machine 2 is mechanically connected to the engine 1, and the power converter 4 (an inverter and a converter) is electrically connected to the three-phase ac terminals of the permanent magnet type synchronous rotary electric machine 2. The dc terminals of the power converter 4 are connected electrically to the battery 5 (high-voltage battery) and a high-voltage system. The high-voltage system is connected through a dc-to-dc converter 30 to a low-voltage system including loads including headlamps and audio apparatus, and a battery 9 (low-voltage battery). Power of a low voltage provided by the dc-to-dc converter 30 connected to the high-voltage system is supplied to the low-voltage system and the battery 9.

The hybrid automobile is provided with a controller 31 for controlling the operation of the permanent magnet type synchronous rotary electric machine 2, and an engine controller 32 for controlling the throttle opening angle of the engine 1, and fuel injection quantity. The controller 31 and the engine controller 32 are connected to each other by communication means, such as signal lines, a communication network, such as a cab LAN (local area network), or a radio system. Thus, information can be transmitted between the controller 31 and the engine controller 32 or direct memory access is possible. Information is exchanged between the controller 31 and the engine controller 32 for the coordination control of the permanent magnet type synchronous rotary electric machine 2 and the engine 1.

Figure 9:
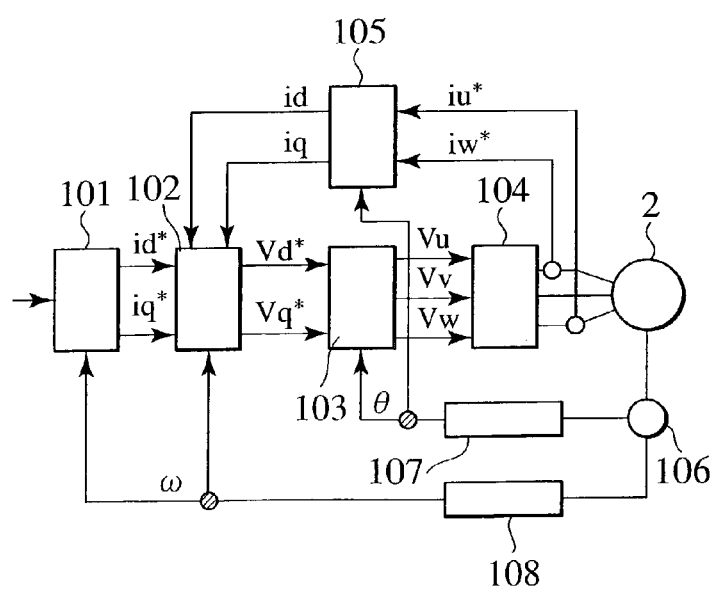
FIG. 9 is a block diagram of a controller for controlling the permanent magnet type synchronous rotary electric machine shown in FIG. 1.

FIG. 9 shows the configuration of the controller 31. The controller 31 carries out operations for switching the operating mode of the permanent magnet type synchronous rotary electric machine 2 between a driving mode (electric motor) and a power generating mode (generator) and generation of control signals for controlling the operation of the permanent magnet type synchronous rotary electric machine 2 according to the operating condition of the automobile. The operation of the permanent magnet type synchronous rotary electric machine 2 is controlled by turning on and off a semiconductor switching device included in the power converter 4 (inverter 104) on the basis of a control signal provided by the controller 31. The operating mode of the permanent magnet type synchronous rotary electric machine 2 is switched by controlling the actuator 25 for driving the stopper 24 according to the operating condition of the automobile. Sensors combined with the engine controller 32 and on-vehicle equipment send signals representing, for example, the residual capacity of the battery, the operating mode of the automobile, the throttle opening angle and such to the controller 31. Signals representing the rotating speed and the magnetic pole positions of the permanent magnet type synchronous rotary electric machine 2, and the currents of the two phases of three-phase currents supplied to the permanent magnet type synchronous rotary electric machine 2 are fed back to the controller 31.

A decision unit 101 receives signals provided by the sensors combined with the engine controller 32 and the on-vehicle equipment, and an angular speed signal provided by a speed conversion unit 108 and representing an angular velocity ω, determines the operating mode of the permanent magnet type synchronous rotary electric machine 2, and provides current commands $i_d^*$ and $i_q^*$ for a rotatory coordinate system having a d-axis and a q-axis. In the rotatory coordinate system, the d-axis extends in the direction of the magnetic pole position (magnetic flux) of the rotary electric machine, and the q-axis extends electrically perpendicularly to the d-axis. Therefore, $i_d^*$ indicates a d-axis current command, and $i_q^*$ indicates a q-axis current command. The speed conversion unit 108 provides an angular velocity ω corresponding to the rotating speed of the rotor shaft of the permanent magnet type synchronous rotary electric machine 2 measured by a detector 106. Engine speed may be used instead of the rotating speed of the rotor shaft of the permanent magnet type synchronous rotary electric machine 2 or a value obtained by multiplying engine speed may be used instead of the rotating speed of the rotor shaft of the permanent magnet type synchronous rotary electric machine 2 when a speed change gear is used.

A current control unit 102 receives the signal representing the angular velocity ω provided by the speed conversion unit 108, the current commands $i_d^*$ and $i_q^*$ provided by the decision unit 101, and signals provided by a coordinate conversion unit 105 and representing currents $i_d$ and $i_q$, calculates the differences between the current command $i_d^*$ and the current $i_d$ and between the current command $i_q^*$ and the current $i_q$, and provides voltage commands $v_d^*$ and $v_q^*$ according to the differences and the angular velocity ω. The coordinate conversion unit 105 provides the currents $i_d$ and $i_q$ on the basis of a u-phase current $i_u^*$ and w-phase current $i_w^*$ among three-phase currents provided by the inverter 104, and a magnetic pole position θ provided by a magnetic pole position conversion unit 107. The magnetic pole position conversion unit 107 provides the magnetic pole position θ on the basis of the magnetic pole position of the permanent magnet type synchronous rotary electric machine 2 measured by the detector 106.

A three-phase conversion unit 103 receives the magnetic pole position θ provided by the magnetic pole position conversion unit 107 and the voltage commands $v_d^*$ and $v_q^*$ provided by the current control unit 102, and provides a u-phase voltage command $v_u$, a v-phase voltage command $v_v$ and a w-phase voltage command $v_w$ on the basis of those received values. The u-phase voltage command $v_u$, the v-phase voltage command $v_v$ and the w-phase voltage command $v_w$ are given to the inverter 104 to control current supplied to the permanent magnet type synchronous rotary electric machine 2 by the inverter 104. Thus the operation of the permanent magnet type synchronous rotary electric machine 2 is controlled.

Figure 10:
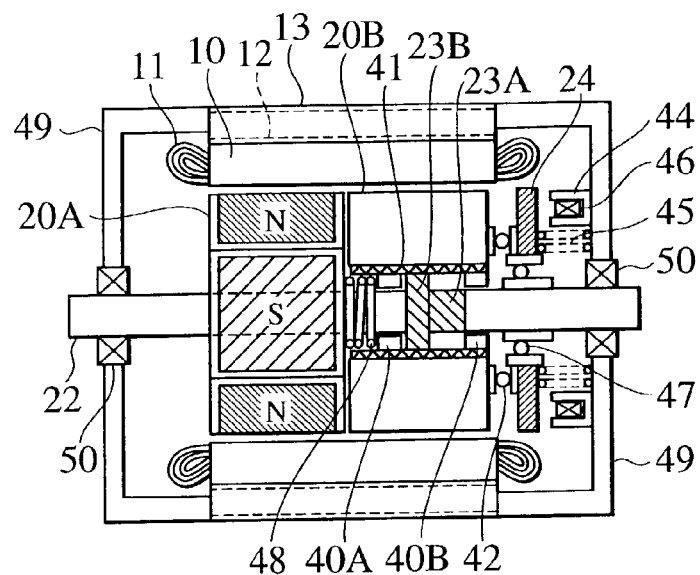
FIG. 10 is a sectional view of a permanent magnet type synchronous rotary electric machine of a second embodiment according to the present invention.
Figure 11:
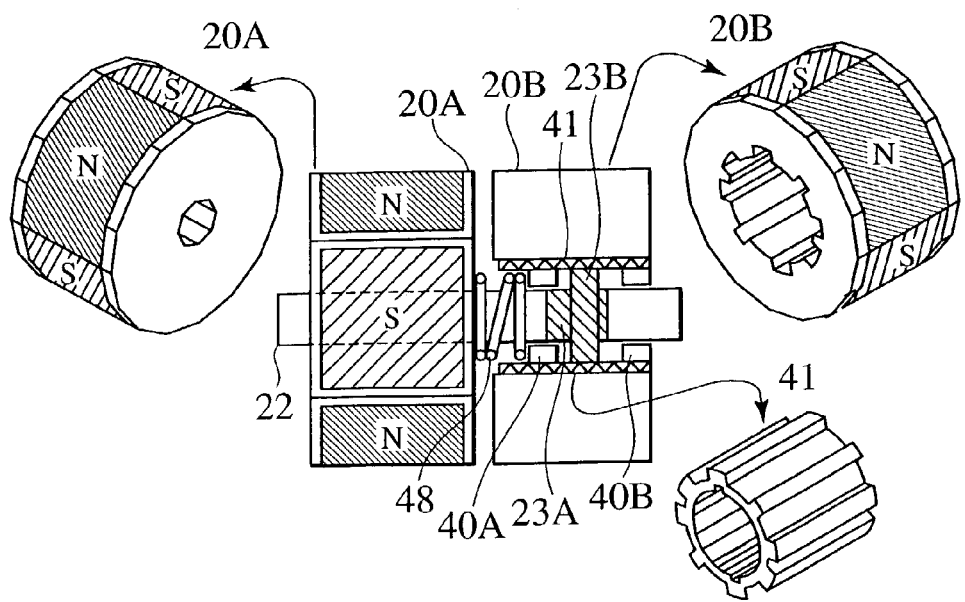
FIG. 11 is an explanatory view of for the construction of the permanent magnet type synchronous rotary electric machine shown in FIG. 10.
Figure 12:
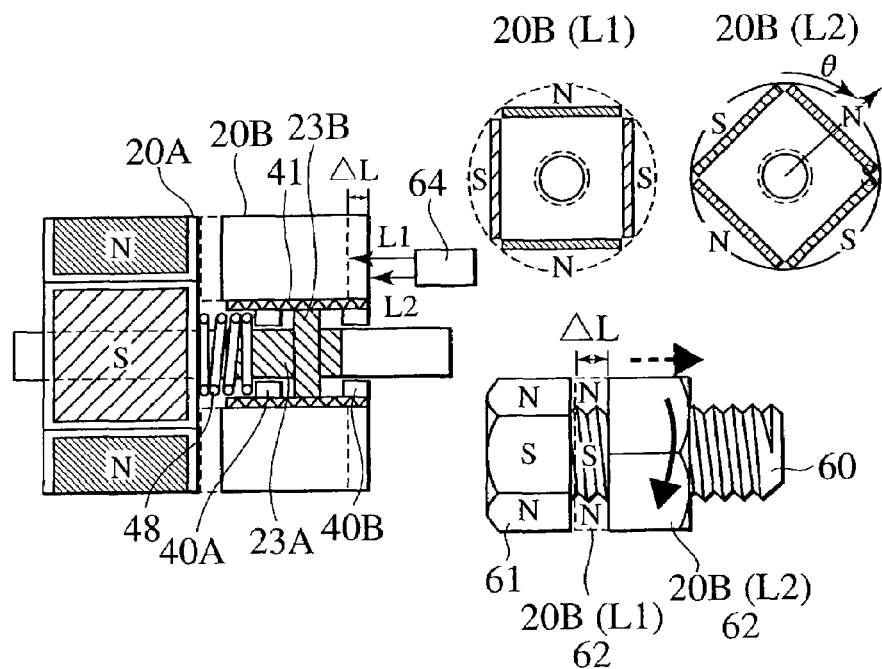
FIG. 12 is an explanatory view for an operation which controls current supplied to the permanent magnet type synchronous rotary electric machine shown in FIG. 10.

A permanent magnet type synchronous rotary electric machine 2 in a second embodiment according to the present invention will be described with reference to FIGS. 10 to 12 showing the configuration of the permanent magnet type synchronous rotary electric machine 2. The permanent magnet type synchronous rotary electric machine 2 in the second embodiment is an improved modification of the permanent magnet type synchronous rotary electric machine 2 in the first embodiment. Parts of the second embodiment like or corresponding to those of the first embodiment are denoted by the same reference characters and the description thereof will be omitted, and only parts of the second embodiment different from those of the first embodiment will be described. The permanent magnet type synchronous rotary electric machine 2 in the second embodiment has a housing 13, annular end brackets 49, i.e., frame members, respectively closing the opposite axial ends of the housing 13, and bearings held on the end brackets 49 and supporting a shaft 22 for rotation.

A rotor 20, similarly to the rotor 20 of the first embodiment, is divided into two parts, namely, a first rotor block 20A and a second rotor block 20B. The inside diameter of the second rotor body 20B is greater than the diameter of the shaft 22. A plurality of axial ridges and a plurality of axial grooves are formed alternately on the inner surface of the second rotor body 20B. A sleeve 41 provided in an alternate arrangement on its outer surface with axial ridges and axial grooves respectively corresponding to the axial grooves and the axial ridges of the second rotor body 20B is fitted in the inner surface of the second rotor body 20B. A nut 23B provided with an internal thread is fixedly fitted in the bore of the sleeve 41. The internal thread of the nut 23B is engaged with an external thread 23A formed on the shaft 22. Thus, the shaft 22 and the nut 23B are in the bolt-and-nut relation. Annular support members 40A and 40B are disposed at a predetermined interval on the opposite sides of the nut 23B in the bore of the sleeve 41 and are fixedly held in place. The support members 40A and 40B guides the second rotor body 20B for rotation and axial reciprocation. A spring 48, i.e., an elastic member, is extended between the support member 40A and the first rotor body 20A. The spring 48 pushes the second rotor body 20B away from the first rotor body 20A.

The sleeve 41 is fitted in the inner surface of the second rotor body 20B to prevent the electrolytic corrosion of the shaft 22 and the nut 23B. If a slight clearance is formed between the inner surface of the second rotor body 20B and the shaft 22, a change in interlocking flux occurs between the inner surface of the second rotor body 20B and the shaft 22 as the rotor 20 rotates, which causes a trouble, such as electrolytic corrosion. Therefore, in the second embodiment, the sleeve 41 is fitted in the inner surface of the second rotor body 20B to shield the shaft 22 magnetically from the inner surface of the second rotor body 20B. The sleeve 41 is formed of a nonmagnetic material having a resistivity higher than that of iron. The sleeve 41 has also an electrical insulating effect. The nut 23B and the sleeve 41 may be integrally formed to reduce the number of parts and to improve the reliability of a conversion mechanism.

A support mechanism is disposed, similarly to the support mechanism of the first embodiment, on one end part of the shaft 22, i.e., beside an outer end not facing the first rotor body 20A of the second rotor body 20B. The support mechanism is a servomechanism including a stopper 24 and a driving mechanism. The driving mechanism includes an actuator 25 and a spring 45. In the second embodiment, the actuator 25 includes an electromagnetic clutch. The electromagnetic clutch has a movable core serving as the stopper 24, an annular yoke 44 disposed on the side surface of the end bracket 49, and a coil 46 placed in the annular groove of the yoke 44. The yoke 44 and the coil 46 form an electromagnetic force generating unit. When the coil 46 is energized an attractive electromagnetic force is generated. The stopper 24 is forced to move away from the second rotor body 20B by the attractive electromagnetic force.

The spring 45 is placed in a space between the shaft 22 and the yoke 44 of the actuator 25 and is extended between the outer side surface not facing the second rotor body 20B of the stopper 24 and the end bracket 49 to push the stopper 24 toward the second rotor body 20B. Current flowing through the coil 46 of the actuator 25 is controlled to control the magnetization of the coil 46 so that the electromagnetic force of the actuator 25 and the pressure of the spring 45 balance with each other. Thus, the axial position of the stopper 24 is controlled optionally.

The permanent magnet type synchronous rotary electric machine in the second embodiment, similarly to that in the first embodiment, can be used as an electric motor while the permanent magnet type synchronous rotary electric machine is operating at operating speeds in a low rotating speed range, and the same can be used as a generator while the permanent magnet type synchronous rotary electric machine is operating at operating speeds in a high rotating speed range. Since the maximum induced electromotive force of the permanent magnet type synchronous rotary electric machine in the second embodiment, similarly to that of the permanent magnet type synchronous rotary electric machine in the first embodiment, can be limited, the battery can be charged by power of voltages not higher than a battery charging voltage and the battery can be prevented from being damaged even if the permanent magnet type synchronous rotary electric machine is used as a generator while the engine is operating at high engine speeds in a high engine speed range.

In switching the permanent magnet type synchronous rotary electric machine in the second embodiment from a motor to a generator, the catch control operation is performed. The catch control operation moves the second rotor body 20B axially relative to the first rotor body 20A to an axial position that makes the intensity of a combined magnetic field created by the permanent magnets 21A and 21B lower than a predetermined intensity, and then moves the second rotor body 20B axially to a predetermined position that makes the intensity of the combined magnetic field created by the permanent magnets 21A and 21B coincide with the predetermined intensity. In the second embodiment, the respective directions of the driving force of the actuator 25, i.e., the electromagnetic attraction, and the force of the spring 45 are reverse to those of the first embodiment. Therefore, the current flowing through the coil 46 is controlled to control the magnetization of the coil 46 such that the electromagnetic force of the coil 46 decreases when the stopper 24 is moved toward the second rotor body 20B and such that the electromagnetic force of the coil 46 increases when the stopper 24 is moved away from the second rotor body 20B. A track along which the stopper 24 moves is the same as that in the first embodiment. Thus, the second embodiment, similarly to the first embodiment, is capable of relieving shocks exerted on the second rotor body 20B, the mechanical axial position changing mechanism including bolts and nuts for changing the axial position of the second rotor body 20B relative to the first rotor body 20A, and the support mechanism, and of reducing load thereon, which improves the reliability of the hybrid automobile.

Axial displacements L1 and L2 of the second rotor body 20B relative to the first rotor body 20A are measured by a displacement measuring instrument 64, and the measured axial displacements L1 and L2 are given for feedback control to a controller for controlling the permanent magnet type synchronous rotary electric machine. When the second rotor body 20B is displaced by an angular displacement θ relative to the first rotor body 20A, the angle of lead of the current to be supplied to the permanent magnet type synchronous rotary electric machine must be corrected on the basis of the axial displacements. The axial displacement ΔL of the second rotor body 20B is proportional to the angular displacement θ. The axial displacements L1 and L2 of the second rotor body 20B relative to the first rotor body 20A are given to the controller for feed-back, and the controller calculates the displacement ΔL and corrects the angle of lead of the current to be supplied to the permanent magnet type synchronous rotary electric machine on the basis of the displacement ΔL. If the angular displacement θ of the second rotor 20B relative to the first rotor body 20A can directly be measured, the angle of lead of the current to be supplied to the permanent magnet type synchronous rotary electric machine may be corrected on the basis of the measured angular displacement θ. The optimum control of the permanent magnet type synchronous rotary electric machine can be achieved by thus correcting the angle of lead of the current.

Figure 13:
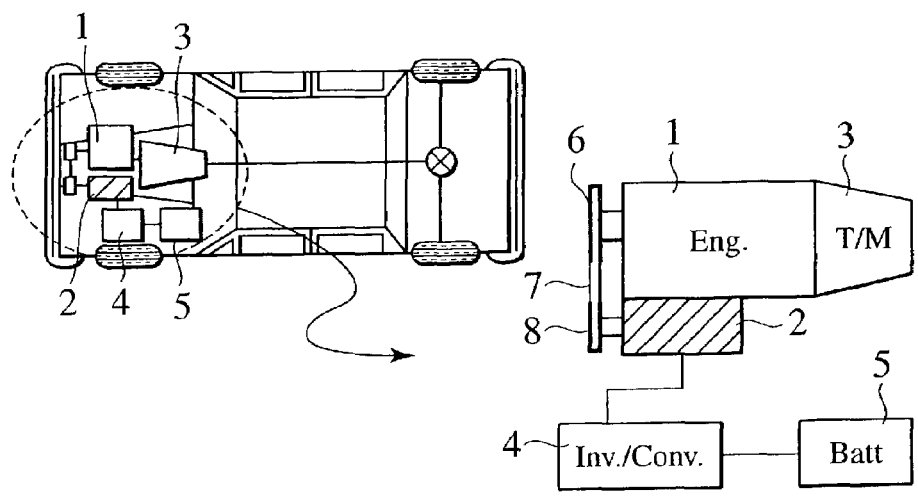
FIG. 13 is a plan view of a driving system included in an automobile in a third embodiment according to the present invention.

A third embodiment according to the present invention will be described with reference to FIG. 13. FIG. 13 shows the arrangement of the mechanisms of a drive system included in an automobile provided with the permanent magnet type synchronous rotary electric machine 2 in the first or the second embodiment. In the drive system of the automobile in the third embodiment, an engine 1 and the permanent magnet type synchronous rotary electric machine 2 are disposed parallel with each other, and a crank pulley 6 included in the engine 1 and a pulley 8 fixedly mounted on the rotor shaft of the permanent magnet type synchronous rotary electric machine 2 are interlocked by a metallic belt 7. The crank pulley 6 and the pulley 8 may be interlocked by a chain or a toothed belt. The engine 1 and the permanent magnet type synchronous rotary electric machine 2 may be interlocked by a gear train instead of by the crank pulley 6, the metallic belt 7 and the pulley 8. The permanent magnet type synchronous rotary electric machine 2 in the first or the second embodiment is employed. Shown also in FIG. 13 are a transmission 3 directly connected to the engine 1, a power converter 4, and a battery 5 electrically connected through the power converter 4 to the permanent magnet type synchronous rotary electric machine 2. The power converter 4 has the functions of both an inverter and a converter. In the drive system of the automobile in the third embodiment, the permanent magnet type synchronous rotary electric machine 2 may be used as an electric motor, a generator or a motor-generator.

The crank pulley 6, the metallic belt 7 and the pulley 8 are able to form a speed change mechanism having a speed change ratio between the engine 1 and the permanent magnet type synchronous rotary electric machine 2. Suppose that the ratio of the radius of the crank pulley 6 to that of the pulley 8 is 2:1, the permanent magnet type synchronous rotary electric machine 2 can be driven at an operating speed twice the engine speed of the engine 1. Therefore, the torque of the permanent magnet type synchronous rotary electric machine 2 required for starting the engine 1 is half a torque necessary for rotating the crankshaft of the engine 1, and hence the permanent magnet type synchronous rotary electric machine 2 may be small.

The following automobiles employing the permanent magnet type synchronous rotary electric machine in the first or the second embodiment can be realized.

An automobile comprising an internal combustion engine used for driving wheels, a battery capable of discharging and being charged, a motor-generator connected mechanically to a crankshaft of the engine, capable of being driven by power supplied by the battery to drive the internal combustion engine, of being driven by the power of the internal combustion engine for power generation to charge the battery, a power converter for controlling power supplied to the motor-generator and power generated by the motor-generator, and a controller for controlling the power converter, wherein the motor-generator is the permanent magnet type synchronous rotary electric machine in the first or the second embodiment. This automobile is an ordinary automobile that uses the internal combustion engine for driving the wheels or a hybrid automobile that uses both the internal combustion engine and the motor-generator for driving the wheels.

An automobile comprising an internal combustion engine used for driving wheels, a battery capable of discharging and being charged, a motor-generator capable of being driven by power supplied by the battery to drive the wheels, of being driven by the wheels for power generation to charge the battery, a power converter for controlling power supplied to the motor-generator and power generated by the motor-generator, and a controller for controlling the power converter, wherein the motor-generator is the permanent magnet type synchronous rotary electric machine in the first or the second embodiment. This automobile is a hybrid automobile that uses both the internal combustion engine and the motor-generator for driving the wheels.

An automobile comprising a battery capable of discharging and being charged, a motor-generator capable of being driven by power supplied by the battery for driving wheels, of being driven by power supplied by the battery to drive the wheels, of being driven by the wheels for power generation to charge the battery, a power converter for controlling power supplied to the motor-generator and power supplied by the motor-generator, and a controller for controlling the power converter, wherein the motor-generator is the permanent magnet type synchronous rotary electric machine in the first or the second embodiment. This automobile is an electric vehicle that uses the permanent magnet type synchronous rotary electric machine for driving wheels.

The present invention provides a rotary electric machine capable of improving the reliability of an object provided with the rotary electric machine. The present invention provides an automobile provided with a highly reliable rotary electric machine. The present invention provides a rotary electric machine capable of relieving shocks that act on a rotor and a varying mechanism when the operation of the rotor is varied and of reducing load on the rotor and the varying mechanism, and an automobile provided with the rotary electric machine.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A rotary electric machine comprising:
   a stator provided with windings;
   a rotor including axially arranged first and second rotor bodies each provided with field magnets of different polarities alternately arranged in a rotating direction; and
   an axial position changing mechanism for changing the axial position of the second rotor body relative to the first rotor body according to balance of magnetic force acting between the field magnets of the first rotor body and those of the second rotor body, and the direction of torque of the rotor;
   wherein, in changing the axial position of the second rotor body relative to the first rotor body to a predetermined position such that the intensity of a combined magnetic field created by the field magnets is reduced, the second rotor body is moved axially to the predetermined position after axially moving the second rotor body relative to the first rotor body to a position that makes the intensity of a combined magnetic field lower than that of a combined magnetic field that is created when the second rotor body is moved to the predetermined position.

2. The rotary electric machine according to claim 1, wherein the first rotor body is fixedly mounted on a rotor shaft, the second rotor body is separated from the rotor shaft, and a thread cut on the rotor shaft is engaged with a thread cut on the inner surface of the second rotor body.

3. The rotary electric machine according to claim 1, wherein the first rotor body is fixedly mounted on a rotor shaft, the second rotor body is separated from the rotor shaft, annular members having inner surfaces provided with threads are fitted in nonmagnetic members fitted in the rotor bodies, and a thread cut on the rotor shaft is engaged with the threads cut on the inner surfaces of the annular members.

4. The rotary electric machine according to claim 1, wherein the first rotor body is fixedly mounted on a rotor shaft, the second rotor body is separated from the rotor shaft, annular members having inner surfaces provided with threads are fitted in tubular nonmagnetic members having a resistivity higher than that of iron and fitted in the rotor bodies, and a thread cut on the rotor shaft is engaged with the threads cut on the inner surfaces of the annular members.

5. The rotary electric machine according to claim 1 further comprising a controller for controlling current supplied to the windings, wherein the controller corrects the lead angle of the current according to the difference in magnetic pole position between the field magnets of the first rotor body and those of the second rotor body.

6. The rotary electric machine according to claim 1 further comprising a controller for controlling current supplied to the windings, wherein the controller corrects the lead angle of the current according to axial displacement of the first rotor body relative to the second rotor body.

7. The rotary electric machine according to claim 1, wherein the pole center of the field magnets of the first rotor body and that of the field magnets of the second rotor body are aligned by balancing magnetic force acting between the respective field magnets of the first and the second rotor body, and the direction of torque of the rotor when the rotary electric machine is operated as an electric motor, and the pole center of the field magnets of the second rotor body is shifted relative to the pole center of the field magnets of the first rotor body when the rotary electric machine is used as a generator.

8. The rotary electric machine according to claim 1 further comprising a support mechanism for supporting the second rotor body, wherein the support mechanism supports a part opposite to a part, on the side of the first rotor body, of the second rotor body for rotation, and includes a support member capable of axially moving along the rotor shaft, and a driving mechanism for axially moving the support member along the rotor shaft.

9. The rotary electric machine according to claim 1 further comprising a support mechanism for supporting the second rotor body, wherein the support mechanism is a servomechanism capable of controlling the axial position of the second rotor body relative to the first rotor body, supports a part opposite to a part, on the side of the first rotor body, of the second rotor body for rotation, and includes a support member capable of axially moving along the rotor shaft, and a driving mechanism for axially moving the support member along the rotor shaft.

10. The rotary electric machine according to claim 1, wherein an elastic member is interposed between the first and the second rotor body.

11. A rotary electric machine comprising:
a stator provided with windings;
a rotor including axially arranged first and second rotor bodies each provided with field magnets of different polarities alternately arranged in a rotating direction; and
a position changing mechanism for changing the magnetic pole position of the field magnets of the second rotor body relative to the magnetic pole position of the field magnets of the first rotor body, said position changing mechanism changing the axial position of the second rotor body relative to the first rotor body in connection with the magnetic pole position of the field magnets of the second rotor body according to balance of magnetic force acting between the field magnets of the first rotor body and those of the second rotor body, and the direction of torque of the rotor;
wherein, in changing the magnetic pole position of the field magnets of the second rotor body relative to the magnetic pole position of the field magnets of the first rotor body and axially moving the second rotor body relative to the first rotor body to a predetermined position such that the intensity of a combined magnetic field created by the field magnets is reduced, the magnetic pole position of the field magnets of the second rotor body relative to the magnetic pole position of the field magnets of the first rotor body and the axial position of the second rotor body are changed after changing the magnetic pole position of the field magnets of the second rotor body relative to the magnetic pole position of the field magnets of the first rotor body, and axially moving the second rotor body to a position that makes the intensity of the combined magnetic field lower than that of the combined magnetic field that is created when the second rotor body is located at the predetermined position.

12. A rotary electric machine comprising:
a stator;
first and second rotor bodies each provided with field magnets of different polarities alternately arranged in a rotating direction; and
means for changing an axial position of the second rotor body relative to the first rotor body according to balance of magnetic force acting between the field magnets of the first rotor body and the field magnets of the second rotor body, and a rotor direction of torque so that, in changing the axial position of the second rotor body relative to the first rotor body to a predetermined position, the second rotor body is moved axially to the predetermined position after axially moving the second rotor body relative to the first rotor body to a desired position.

13. The rotary electric machine according to claim 12, further comprising a controller configured to control current supplied to windings of the stator, wherein the controller is operative to correct a lead angle of the current according to the difference in magnetic pole position between the field magnets of the first rotor body and the field magnets of the second rotor body.

14. The rotary electric machine according to claim 12, further comprising a controller configured to control current supplied to windings of the stator, wherein the controller is operative to correct lead angle of the current according to axial displacement of the first rotor body relative to the second rotor body.

15. The rotary electric machine according to claim 12, wherein a pole center of the first rotor body field magnets and a pole center of the second rotor body field magnets are alignable by balancing magnetic force acting between the respective field magnets of the first and the second rotor body, and a rotor direction of torque of the rotor when the rotary electric machine is operated as an electric motor, and the pole center of the field magnets of the second rotor body is shiftable relative to the pole center of the field magnets of the first rotor body when the rotary electric machine is used as a generator.

16. A rotary electric machine comprising:
a stator;
axially arranged first and second rotor bodies each provided with field magnets of different polarities alternately arranged in a rotating direction; and
means for changing a magnetic pole position of the field magnets of the second rotor body relative to a magnetic pole position of the field magnets of the first rotor body and axially moving the second rotor body relative to the first rotor body in connection with the magnetic pole position of the field magnets of the second rotor body according to balance of magnetic force acting between the field magnets of the first rotor body and those of the second rotor body, and a rotor direction of torque such that;
the magnetic pole position of the field magnets of the second rotor body relative to the magnetic pole position of the field magnets of the first rotor body and the axial position of the second rotor body are changed after changing the magnetic pole position of the field magnets of the second rotor body relative to the magnetic pole position of the field magnets of the first body, and axially moving the second rotor body to a position that makes the intensity of a combined magnetic field lower than that of a combined magnetic field that is created when the second rotor body is located at a predetermined position.

17. A method for changing an axial position of one rotor body of a rotary electric machine relative to another rotor body of the rotary electric machine according to balance of magnetic force acting between field magnets of the rotor bodies, and a rotor direction of torque, comprising
changing the axial position of the one rotor body relative to another rotor body to a predetermined position such that intensity of a combined magnetic field created by the field magnets is reduced, and moving the rotor body axially to the predetermined position after axially moving the one rotor body relative to another rotor body to a position that lowers the intensity of a combined magnetic field than that of a combined magnetic field created when the one rotor body is moved to the predetermined position.

18. A method comprising changing a magnetic pole position of field magnets of one rotor body of a rotary electric machine relative to a magnetic pole position of field magnets of another rotor body of the rotary electric machine, and changing axial position of the one rotor body relative to the another rotor body in connection with the magnetic pole position of the field magnets of the one rotor body according to balance of magnetic force acting between the field magnets of the rotor bodies, and a rotor direction of torque;
wherein, in changing the magnetic pole position of the field magnets of the one rotor body relative to the magnetic pole position of the field magnets of the another rotor body and axially moving the one rotor body relative to the another rotor body to a predetermined position such that the intensity of a combined magnetic field created by the field magnets is reduced, the magnetic pole position of the field magnets of the one rotor body relative to the magnetic pole position of the field magnets of the another rotor body and the axial position of the one rotor body are changed after changing the magnetic pole position of the field magnets of the one rotor body relative to the magnetic pole position of the field magnets of the another rotor body, and axially moving the one rotor body to a position that lowers intensity of the combined magnetic field relative to that of the combined magnetic field created when the one rotor body is located at the predetermined position.

* * * * *